Feb. 25, 1936.　　　H. HUEBER ET AL　　　2,032,321
ACCESSORY SYSTEM FOR MOTOR VEHICLES
Filed March 9, 1932　　　2 Sheets-Sheet 1
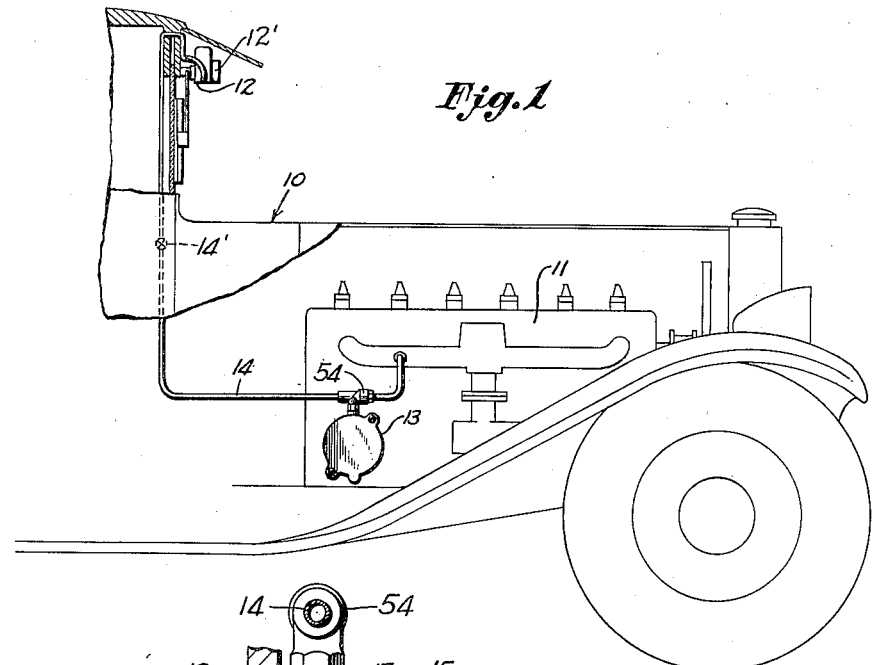
Fig.1
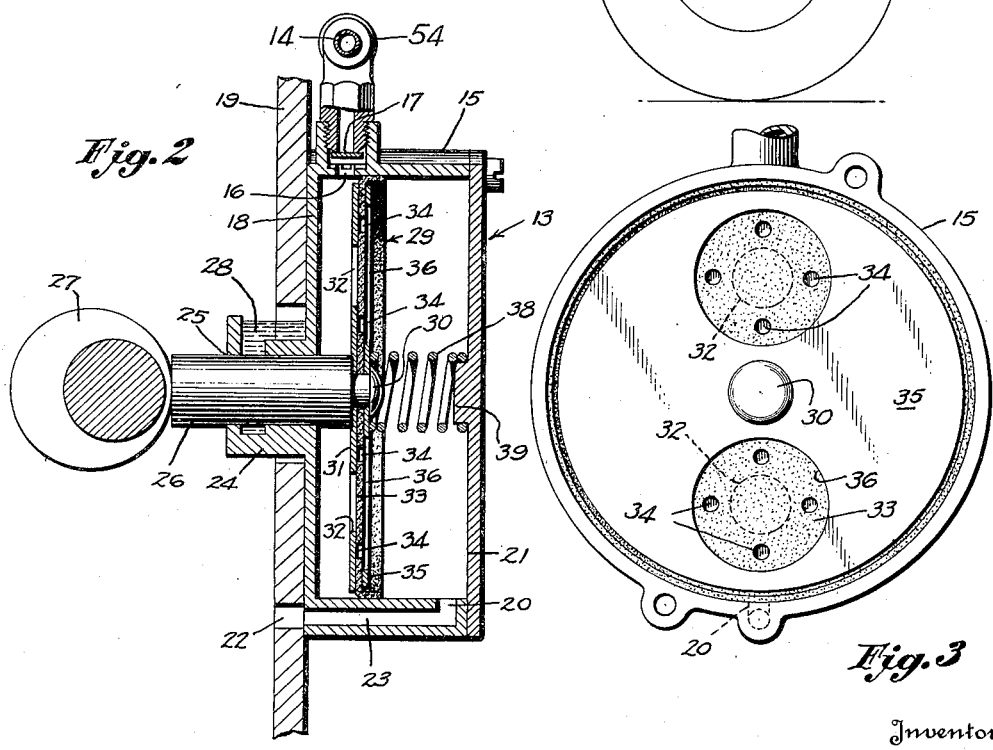
Fig.2
Fig.3
Inventors
Henry Hueber,
Erwin C. Horton.
By Beau & Brooks
Attorneys Feb. 25, 1936.  H. HUEBER ET AL  2,032,321
ACCESSORY SYSTEM FOR MOTOR VEHICLES
Filed March 9, 1932  2 Sheets-Sheet 2

Inventors
Henry Hueber,
Erwin C. Horton.
By Bean + Brooks.
Attorneys

Patented Feb. 25, 1936

2,032,321

UNITED STATES PATENT OFFICE 2,032,321

ACCESSORY SYSTEM FOR MOTOR VEHICLES

Henry Hueber, Buffalo, and Erwin C. Horton, Hamburg, N. Y., assignors to Trico Products Corporation, Buffalo, N. Y.

Application March 9, 1932, Serial No. 597,865

10 Claims. (Cl. 230—190)

The present invention relates to a fluid operated system for motor vehicle accessories.

Heretofore in the operation of certain automotive accessories it has been customary to actuate such accessories by means of the difference in pressure between the atmosphere and the pressure obtaining within the intake manifold of an internal combustion engine. This source of suction, however, has been found to be directly dependent upon the position of the throttle of the carburetor and therefore fluctuates over a rather wide range being at a maximum during those periods of operation wherein the throttle is closed or substantially closed, and decreasing rapidly as the throttle is opened, as for instance during high engine speed or rapid acceleration of the speed of the engine. For the operation of windshield cleaners and other fluid actuated automotive accessories, it is highly desirable that the same maintain a definite and uniform speed of operation regardless of the engine speed.

The instant device provides a system in which the source of supply for the operating pressure has an operating capacity which is wholly adequate and sufficient to meet the demands made on it by the accessories.

In the drawings appended hereto and made a part of this specification:

Fig. 1 is a side elevation of an automotive vehicle with parts broken away, showing the instant device attached thereto.

Fig. 2 is a substantially medial section through the instant device.

Fig. 3 is a section on the line 3—3 of Fig. 2.

Figure 5:
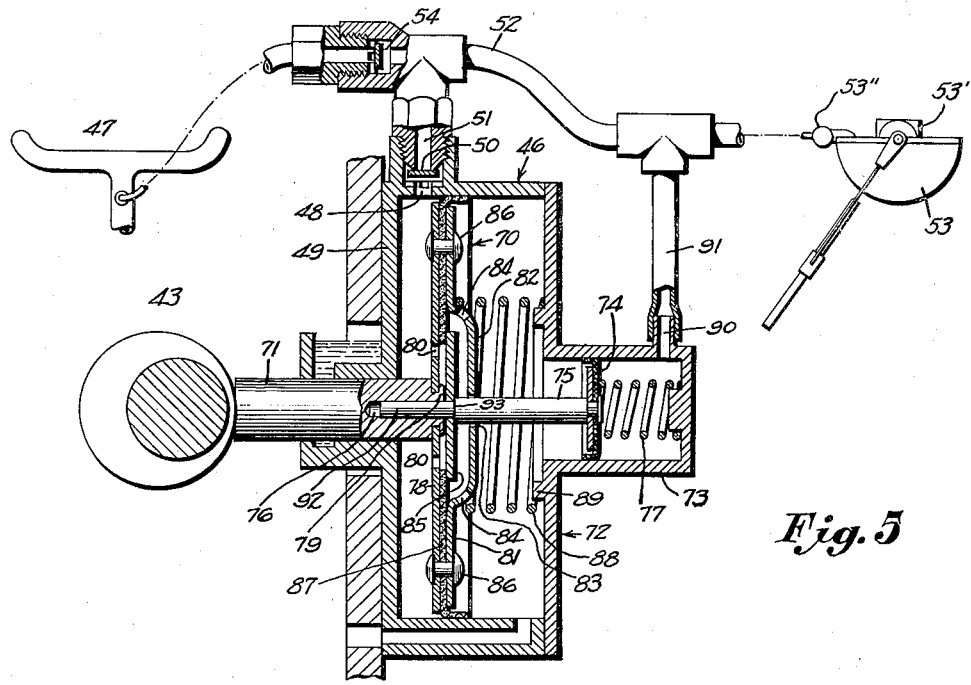
Fig. 5 is another modification similar to that shown in Fig. 4.

Referring more particularly to the drawings an automotive vehicle 10 is provided with an internal combustion engine 11 and an automotive accessory of any desired type, as for instance a windshield wiper 12. This accessory has fluid communication with means for supplying an operating pressure, such as the fluid pump 13, by means of the pipe or conduit 14. The conduit 14 may be closed by a manual control valve 14' to stop the windshield cleaner, the latter having its usual automatic valve action generally indicated at 12'.

This pump is desirably of the suction or negative pressure type and is attached to the crank case of the engine in operative contact with the cam shaft thereof for serving as a driving mechanism for the pump.

The pump proper provides a pump housing 15 with an inlet port 16 connected and in fluid communication with the automotive accessory by a conduit 14 for operating and actuating the device. The opening or port 16, providing such fluid communication, is provided with valving means 17 which permits of unidirectional flow of fluid therethrough into the pump housing. The port 16 is positioned adjacent the base plate 18 of the pump housing which is contiguous to and in contact with a portion 19 of the automotive vehicle, as for instance a side of the crank case.

Another port 20 is positioned in the pump housing adjacent the front plate 21 thereof and has fluid communication with the interior of the crank case by means of the port 22 in the crank case and the passageway 23 of the pump casing, for reasons which will be more fully explained hereinafter.

The back plate 18 of the pump housing is provided with an extension 24 having an aperture therein which provides a bearing surface 25 for a rod 26 which extends into the crank case to be operated by the cam shaft 27. The extension 24 is provided with a well portion 28, open at the upper end and in fluid communication with the interior of the crank case whereby the lubricant contained within the crank case may, when splashed upon the crank case wall, flow into and be retained within the well. This construction serves desirably as a reservoir for lubricating fluid which will be carried along the bearing surface 25 of the extension 24 and the piston rod 26 and find its way into the pump housing 15 and be desirably returned to the crank case through the port 20 and passage 23. This oil acts as a desirable lubricant and keeps the piston in the pump housing soft and pliable.

The pump member or piston 29 of the device is operatively secured to the forward end of the rod 26 by desirable securing means, as for instance by means of the rivet 30.

The piston 29 is composite in structure, being provided with a back plate 31 with an aperture 32 therein. A flexible cup packing 33 is also provided and placed adjacent to the plate 32 in such fashion as to have its flange bear against the wall of the piston chamber. Apertures 34 are formed in this flexible composition or fabric in staggered relation to the aperture 32 formed in the back plate 31. A forward securing plate 35 is placed upon the fabric 33 and the three plates 31, 33 and 35 are all held in tightly assembled relation by means of the rivet 30. The forward plate 35 is provided with apertures 36 which are substantially concentric with the apertures 32 in the back plate 31 and has sufficient radius to include therein the staggered apertures 34 within the fabric portion 33 of the composite piston.

Upon movement of the engine of the automotive vehicle the cam member 27 will cause the rod 26 to move the piston in a direction toward the face or forward plate 21 of the pump housing 15, and the resilient member 38 having bearing contact upon the composite piston 29 will cause the same to move in the opposite direction and retain bearing contact upon the cam member 27. This resilient member 38 is retained in substantially centered relationship with the piston by means of a centering knob 39 formed in the face plate 21, or is retained thereon in other desired and suitable fashion.

From the above description of this mechanism it will be clearly seen that upon the movement of the piston toward the base plate 21 fluid will be drawn into the pump housing through the conduit 14 while fluid will be expelled or urged out of the pump housing through the port 20 and passage 23 into the crank case and so to the atmosphere or to the intake manifold when connected thereto, as will be hereinafter described. Upon movement of the piston in the opposite direction the valving means 17 prevent free fluid communication between the pump housing and the conduit 14 and movement of the fluid therefrom. A certain fluid pressure will be built up within the pump housing and the piston 29 and will force the flexible packing 33 away from the back plate 31 and permit such fluid to flow between the back plate and the packing member through the staggered apertures 34 and into the forward portion of the pump housing between the piston 29 and the face plate 21, whereupon such fluid will be ejected from the pump housing upon reversal of the stroke of the piston. The cup packing 33 is further adapted to permit the passage of a certain amount of fluid between its peripheral flange and the wall of its chamber formed within the pump housing 15 when a too great pressure is produced therein.

It is thus seen that the instant device will provide a fluid pumping mechanism whose capacity is directly dependent upon the speed of the engine by which it is actuated; which will permit controlled passage of fluid therethrough in one direction; and one which will remain flexible and not check or crack with continued use.

Figure 4:
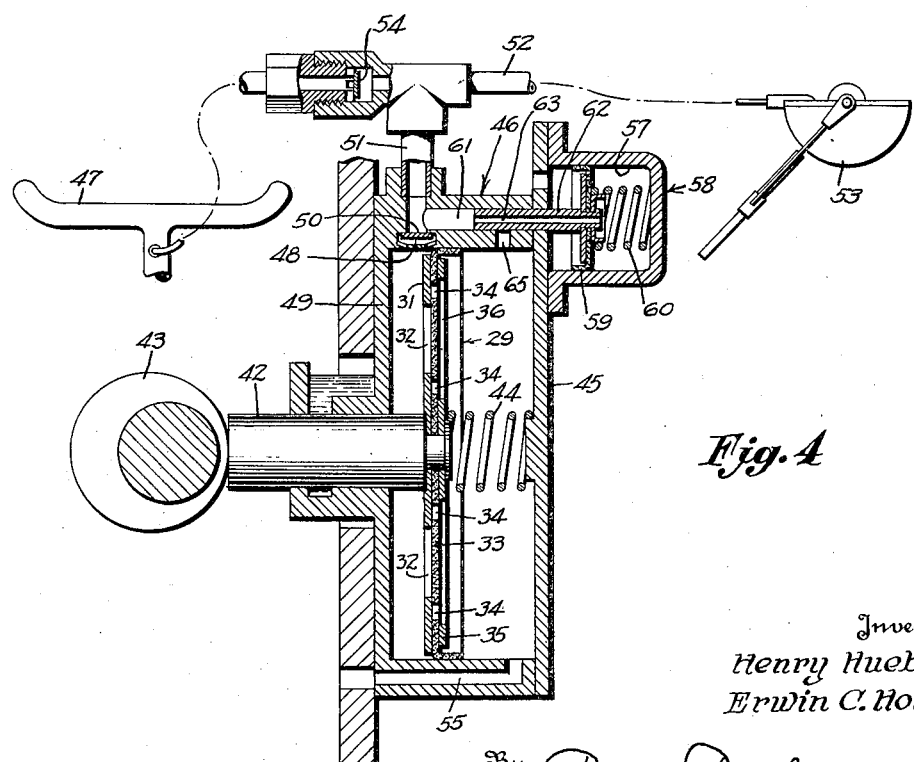
Fig. 4 is a vertical section through a modification of the device, while connections therefrom to the intake manifold of an internal combustion engine and to the fluid pressure motor of a windshield wiper are shown diagrammatically.

A type of the flexible valved piston pump, used in conjunction with the pressure drop within an intake manifold of an internal combustion engine, is shown in Fig. 4 with a modification of the device for actuating the windshield cleaner.

The passageway 61 in the pump housing is in fluid communication with the cylinder defined by the housing 46, under certain conditions of operation, through the port 65 which is positioned in the pump housing between the face plate 45 and the forward limit of movement of the composite piston 29.

Thus, when the pressure within the manifold of the internal combustion engine is sufficiently low for operating the automotive accessory at the desired speed the differential pressures within the auxiliary cylinder 57 are sufficient to cause movement of the piston 59 against the resilient means 60 whereby the piston rod 62 is moved from the position shown in Fig. 4 and permits fluid communication between the passageway 61 and the portion of the pump housing between the face plate 45 and the composite piston 29. Thus, fluid is permitted to flow from the pump housing, or passage 55, upon the forward movement of the composite piston 29 into the passageway 61. This fluid, or a portion of it, may again enter the cylinder chamber through the port 48 and thence to the other side of the composite piston 29 thus permitting a by-passing action upon reciprocation of the piston 29 under the influence of the camming action of the moving portion 43 of the internal combustion engine. It will thus be seen that the pump is ineffective to create a suction of greater degree than the minimum degree of suction which will cause opening of valved port 65, and further, that suction created in the engine manifold, if greater than such minimum degree, will be lowered to such degree by the entrance of atmospheric air through port 55, the cylinder chamber, port 65, and passages 61, 51.

When the pressure drop within the intake manifold is insufficient, however, to operate the accessory at the desired speed, the resilient means 60 move the piston 59 to the position shown in Fig. 4 whereby the by-passing action is eliminated as the port 65 is closed by the piston rod 62. Under these conditions of operation, reciprocation of the composite piston 29 causes fluid to flow through the passageway 55 into the crank case thereby causing fluid to be drawn through the conduit 51 into the piston housing 46. Upon the reversal of the stroke of the composite piston, under the influence of the resilient means 44, any fluid pressure built up between the back plate 49 of the pump housing and the composite piston 29 is caused to pass through the composite piston as described hereinabove, since the valving means 50 prevent passage of fluid from the housing to the conduit 51.

Another modification of the device is shown in Fig. 5 wherein a pump housing 46 is provided with a composite reciprocable piston 70, a piston rod 71 operatively connected thereto and having bearing connection upon a moving part of the internal combustion engine, such as the camming member 43.

The face plate 72 of the pump housing is provided with an extension member 73 having formed therein a cylinder adapted to enclose the auxiliary piston 74 for reciprocatory movement therein. The piston 74 is provided with a rod 75 operatively connected thereto a reduced end 92 of which extends into a guiding channel 76 provided within the rod 71 and relative to which the piston rod 75 may have independent movement. Resilient means 77 are provided for moving the piston 74 in one direction, while movement in the other direction is produced by means of a pressure drop, as will be explained more fully hereinafter.

The composite piston member 70 comprises a back plate member 78 which is operatively connected to a piston rod 71 in any desirable or suitable fashion, as for instance by means of the rivet head shown at 79. The back plate member 78 is provided with ports 80 therein which permit of movement of fluid therethrough under certain conditions of operation. A front plate 81 is also provided as a portion of the composite piston 70 the said plate having an offset portion 82 substantially centrally thereof which is provided with an aperture 83 for permitting the passage of the piston rod 75 therethrough for communicating with the guiding channel 76 formed in the piston rod 71. The face plate 81 is also provided with apertures 84 for permitting flow of fluid therethrough. The bulged or offset portion 82 of the face plate is provided to retain therein the valving member or plate 85 which is adapted to open and close the ports 80 of the back plate 78 and regulate fluid passage therethrough. The plate 85 is guided by the reduced end 92 of the rod 75 and held against the backing by the shoulder 93 thereof.

Enclosed within the back plate 78 and the face plate 81 and held therebetween in tightly assembled relation in any desired fashion, as for instance by rivets 86, is a flexible packing member 87 having an apertured central portion permitting of free and unimpeded passage of fluid to the apertures 80 of the back plate. This packing 87 also serves as a valve seating member for the valve plate 85, and thereby provides a tight piston member upon forward movement of the composite piston 70. These various plates are assembled in tight and compact relationship by any desirable methods, as for instance by means of the rivets 86 shown in the drawings.

Movement of the piston in the forward direction is caused by the urging action of the cam member 43 and movement in the opposite direction is induced by means of the resilient member or spring 88 which has bearing contact against the face of the composite piston 70 and against the face plate 72 of the pump housing. In the disposition illustrated in Fig. 5 the resilient member 88 surrounds and encloses the piston rod 75 and is retained in place by means of the offset 82 formed upon the face plate 81 of the composite piston 70 and by means of a retaining member 89 formed in the face plate 72 of the housing. The operation of the pump mechanism will now be clearly understood since the camming member 43 causes forward movement of the rod 71 and the composite piston thus causing the valving plate 85 to seat upon the flexible fabric member 87 and form a tightly sealed piston which will urge fluid into the passageway 55 formed in the pump housing and into the crank case through the port 22 formed in the side wall of the engine. The return stroke of the piston is caused by the urging action of the resilient means 88 whereby the composite piston is moved toward the crank case and any fluid pressure built up between the piston and the back plate 49 of the housing will move the valving means 85 and permit controlled flow of fluid through the ports 80 of the back plate 70 of the piston and the ports 84 of the front plate thereof.

A port 48 is provided in the pump housing between the back plate thereof and the composite piston 70 which is provided with valving means 50 which permits flow of fluid into the pump housing and prevents egress of fluid therefrom.

When the device is used as a suction producing device in conjunction with the intake manifold of an internal combustion engine, the manifold 47 is attached to a conduit 52 which in turn is in fluid communication with a conduit 51 attached to the pump housing 46 at the port 48. The conduit 52 is provided with valving means 54 therein which permit flow of fluid toward the intake manifold 47 of the internal combustion engine but which prevent fluid flow in the opposite direction. The conduit 52 is further connected in fluid communication with an automotive accessory 53 having a moving piston.

In this connection it may be noted that the pump discharges away from the intake manifold so as to avoid altering the combustible mixture therein. Further, excess manifold suction will tend to hold the pump inlet valve closed and be ineffective on the pump piston when the pressure in the manifold is lower than in the pump.

Means are provided for moving the auxiliary piston 74 against the resilient means 77 by the use of a pressure drop. Fluid communication is therefore provided between the cylinder 73 and a convenient source of suction, as for instance between the intake manifold 47 and the cylinder 73. Thus an opening 90 is provided in the cylinder 73 connected by conduit 91 to the conduit 52 from the intake manifold to the automotive accessory, thus insuring the production of a pressure drop in the cylinder 73.

Under conditions of operation of the internal combustion engine wherein the pressure drop in the intake manifold is quite sufficient to operate the accessory at the desired rate, the piston 74 is urged against the resilient means 77 thereby permitting free and uninterrupted operation of the valving plate 85 against the flexible diaphragm 87 of the composite piston 70. Under such conditions of operation reciprocation of the composite piston 70 in a forward direction against the resilient means 88 causes fluid flow through the passageway 55 formed in the pump housing, through the port 22 in the side of the crank case and into the crank case. Movement in the opposite direction is caused by the resilient means 88 and since the valving plate 85 is not held tightly against the flexible membrane 85 by the shoulder 93 of the rod 75, fluid is caused to flow through the ports 80 of the back plate and into the forward compartment of the pump.

Under operating conditions where an insufficient pressure drop obtains within the intake manifold there is an insufficient suction in the cylinder 73 to move the cylinder against the urging action of the resilient means 77, in consequence whereof, the shoulder 93 of the rod 75 urges the valving plate tightly against the flexible member 87 and forms a fluid tight piston and intensifies the suction in the conduit 52.

From the foregoing it will be observed that the pump is given a part time functioning, the same coming into function when the manifold suction is insufficient of itself to operate the cleaner. When the manifold suction is sufficient to operate the cleaner the pump will idle by reason of the by-pass arrangements in Figs. 4 and 5, or by reason of the inlet valve 17 in Fig. 2 being held to its seat by the lower pressure on the windshield cleaner side thereof.

What is claimed is:

1. A pump for exhausting fluid from a conduit, said pump comprising a casing having a cylinder, a check valved connection from the conduit to the cylinder, a piston in said cylinder permitting uni-directional fluid flow therethrough, a second cylinder on said pump casing, a piston in said second cylinder having a rod controlling the passage of fluid through said first piston, resilient means for moving said second piston in one direction, and fluid connection with said conduit to said second cylinder for moving said second piston against said resilient means.

2. In a fluid pump for being actuated from the cam shaft of a motor vehicle engine, a cylinder adjacent the engine crank case, a rod mounted for reciprocation in the end of the cylinder by the engine cam shaft, a piston secured to the rod and reciprocal in the cylinder, said piston dividing the cylinder into an inner chamber adjacent the crank case and an outer chamber, a spring in said outer chamber for moving the piston to restrict said inner chamber and to retain the rod against the cam shaft, said piston having an aperture therethrough and a valve member in said outer chamber adapted to seat over said aperture, a valved fluid inlet passage into said inner chamber, and an unvalved fluid outlet passage from said outer chamber into the engine crank case.

3. In a suction pump, a cylinder, a piston reciprocal in the cylinder and dividing the latter in two chambers, a valved inlet fluid passage in one chamber connecting the chamber to a suction conduit, an outlet fluid passage from the other chamber, said piston having an opening therethrough, a valve in said other chamber seating against the piston over said opening, a second cylinder communicating with said other chamber, a second piston in said second cylinder and connected to said valve, spring means for normally holding the valve seated, and a passage connecting the portion of the second cylinder remote from said other chamber to said suction conduit, whereby a predetermined degree of suction in the suction conduit will cause said second piston to move to permit unseating of the valve.

4. In a suction pump, a cylinder, a piston reciprocal in the cylinder and dividing the latter into two chambers, a suction conduit and a valved fluid inlet passage therefrom into one of said chambers, a fluid outlet passage from the other chamber, a second and smaller cylinder, a second piston in said second cylinder having a piston rod slidably engaging the first piston, said first piston having an opening therethrough, a valve in said other chamber for normally closing said opening and carried by said piston rod, spring means for normally seating the valve, and a conduit connecting the second cylinder (the portion thereof on the side of the second piston opposite from the valve) to the suction conduit.

5. In a fluid pump operable from a cam shaft of a motor vehicle engine, a cylinder, a piston in the cylinder having a piston rod reciprocated by the cam shaft, said piston dividing the cylinder into two chambers, a fluid conduit having a valved passage into one of said chambers, and an atmospheric vent in the other of said chambers, said piston having an opening therethrough, a fluid pressure operable valve and resilient means for normally seating said valve over the opening, and means responsive to the fluid pressure in said conduit for rendering said resilient means ineffective when the pressure in said conduit reaches a predetermined degree, whereby fluid may by-pass said piston and prevent further pumping action thereof.

6. Means for partially evacuating a conduit comprising a pump having a pump chamber with valved inlet and outlet passages, said inlet passage communicating with a portion of said conduit, a by-passage between said portion of the conduit and said chamber, and valve means in said by-passage responsive to fluid pressure in said portion of the conduit for opening and closing said by-passage when the degree of suction in said portion of the conduit respectively reaches predetermined maximums and minimums.

7. A pump for exhausting fluid from a suction conduit comprising a cylinder and a piston dividing the cylinder into two chambers, a valved fluid inlet passage to one chamber from the conduit, a fluid outlet from the other chamber, said piston having a valved passage therethrough to permit fluid to pass only from said one chamber to said other chamber, a by-passage connecting said other chamber and the conduit, and valve means in said by-passage responsive to fluid pressure in the conduit for opening and closing said by-passage when the degree of suction in the conduit respectively reaches predetermined maximums and minimums.

8. A fluid pump comprising a cylinder and a piston dividing the cylinder into two chambers, a valved fluid inlet passage into one chamber, a fluid passage from the other chamber to the atmosphere, said piston having a valved passage to permit fluid flow in one direction only between said chambers, a by-passage connecting said other chamber and said conduit, a valve in said by-passage, and means responsive to the pressure in said conduit closing and opening said valve when the differential between the pressure in said conduit and atmosphere respectively reaches a predetermined minimum and a predetermined maximum.

9. In a pump, a piston for passing fluid therethrough in one direction, comprising a flexible member having its periphery cupped for engagement with a cylinder wall, the cupped portion of the flexible member being yieldable to pass fluid thereby during movement of the piston in one direction, a rigid plate on each side of the flexible member and clamping the latter therebetween, said plates having aligned apertures, and said flexible member having an aperture out of alignment with the aperture in one plate and aligned with the aperture in the other plate, whereby the apertured portion of the flexible member may be bulged into the last mentioned aperture by fluid pressure to provide a passageway through the piston via the apertures.

10. In a pump, a piston for passing fluid therethrough in one direction, comprising a flexible member, a rigid plate on each side of the flexible member, one plate having an aperture and the other plate having a concentric aperture of larger diameter, and the flexible member having a plurality of apertures in a zone lying between the peripheries of plate apertures.

HENRY HUEBER.
ERWIN C. HORTON.